(12) United States Patent
Miller et al.

(10) Patent No.: US 11,459,956 B2
(45) Date of Patent: Oct. 4, 2022

(54) FACE SEAL ARRANGEMENT WITH REDUCED BALANCE RATIO

(71) Applicant: Raytheon Technologies Corporation, Farmington, CT (US)

(72) Inventors: Jonathan Logan Miller, Belchertown, MA (US); Nasr A. Shuaib, Watertown, MA (US); Christopher J. Larson, Newfield, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 136 days.

(21) Appl. No.: 17/104,459

(22) Filed: Nov. 25, 2020

(65) Prior Publication Data

US 2022/0162994 A1    May 26, 2022

(51) Int. Cl.
  *F02C 7/28*   (2006.01)
  *F02C 7/06*   (2006.01)
  (Continued)

(52) U.S. Cl.
  CPC .................. *F02C 7/28* (2013.01); *F02C 7/06* (2013.01); *F02C 7/36* (2013.01); *F02K 3/06* (2013.01);
  (Continued)

(58) Field of Classification Search
  CPC ...... F02C 7/28; F02C 7/06; F02C 7/36; F02K 3/06; F05D 2220/323; F05D 2240/50; F05D 2240/55; F01D 11/003; F01D 25/162; F01D 25/183; F16J 15/3416; F16J 15/3448; F16J 15/3412; F16J 15/3452
  See application file for complete search history.

(56) References Cited

U.S. PATENT DOCUMENTS

| 4,406,459 A | 9/1983 | Davis et al. |
| 9,732,622 B1 * | 8/2017 | Mills ....................... F01D 11/02 |

(Continued)

FOREIGN PATENT DOCUMENTS

| EP | 0013678 A1 | 8/1980 |
| EP | 0840043 A2 | 5/1998 |

(Continued)

OTHER PUBLICATIONS

European Search Report for EP Application No. 21210583.7 dated Feb. 11, 2022.

*Primary Examiner* — Brian P Wolcott
*Assistant Examiner* — Joshua R Beebe
(74) *Attorney, Agent, or Firm* — Carlson, Gaskey & Olds, P.C

(57) ABSTRACT

A face seal arrangement includes a seal seat rotating with the shaft and a non-rotating face seal including a sealing ring. The sealing ring includes a sealing face biased into contact with the seal seat. The sealing ring also has a groove defined remote from the seal face relative to the seal seat. The groove provides a pressure face that will be exposed to high pressure air outward of the bearing compartment. A coil spring biases the seal housing towards the seal seat, such that the sealing face of the sealing ring is biased into contact with seal seat by air pressure against the pressure face, and the coil spring. A balance ratio is defined between an area of the pressure face and an area of the sealing face, the balance ratio is between 0.5 and 0.64.

20 Claims, 7 Drawing Sheets

(51) Int. Cl.
    *F02C 7/36*         (2006.01)
    *F02K 3/06*         (2006.01)

(52) U.S. Cl.
    CPC .... *F05D 2220/323* (2013.01); *F05D 2240/50* (2013.01); *F05D 2240/55* (2013.01)

(56) References Cited

U.S. PATENT DOCUMENTS

| | | | |
|---|---|---|---|
| 10,385,713 B2 | 8/2019 | Walker et al. | |
| 10,619,741 B2 | 4/2020 | Walker et al. | |
| 2004/0173971 A1* | 9/2004 | Kudari | F16J 15/3404<br>277/361 |
| 2004/0227297 A1* | 11/2004 | Azibert | F16J 15/3448<br>277/361 |
| 2004/0227298 A1* | 11/2004 | Azibert | F16J 15/3472<br>277/370 |
| 2011/0198813 A1* | 8/2011 | Takahashi | F04D 29/126<br>277/387 |
| 2015/0337674 A1* | 11/2015 | Sonokawa | F02C 7/28<br>415/173.3 |
| 2016/0178065 A1* | 6/2016 | Nakahara | F16J 15/348<br>277/387 |

FOREIGN PATENT DOCUMENTS

| | | |
|---|---|---|
| EP | 1455123 A1 | 9/2004 |
| EP | 3438417 A1 | 2/2019 |
| WO | 2004/079234 A2 | 9/2004 |
| WO | 2014/107161 A1 | 7/2014 |

* cited by examiner

FACE SEAL ARRANGEMENT WITH REDUCED BALANCE RATIO

BACKGROUND OF THE INVENTION

This application relates to face seals as utilized in gas turbine engines.

Gas turbine engines are known, and typically include a fan delivering into a bypass duct for propulsion, and into a core engine where it is compressed. The compressed air is delivered into a combustor where it is mixed with fuel and ignited. Products of this combustion pass downstream over turbine rotors, driving them to rotate. The turbine rotors, in turn, drive compressor rotors and the fan. Shafts connect the turbine rotors to the compressor and fan rotors.

Bearings support these shafts. The bearings may be provided with lubricant, and thus it is desirable to seal a compartment on each axial side of the bearings.

Face seal arrangements are utilized in the prior art. A seal seat rotates with the shaft on each side of the bearing. A face seal is biased in the contact with the seal seat.

Typically a spring force biases the face seal into the seal seat. Pressurized air acting on a surface of the face seal also provides a bias force.

In the prior art the balance ratio, which is the area over which the pressurized air acts on the face seal taken as a ratio to the entire sealing face area of the face is relatively high. In addition, with this arrangement the spring force has been relatively high. This has resulted in challenges for operation of the prior face seal arrangements. A high axial closing force results in high heat generation, and sometimes oil coking and result in reduced service life.

SUMMARY OF THE INVENTION

In a featured embodiment, a gas turbine engine includes a fan for delivering air into a bypass duct as propulsion air and to a core engine. The core engine includes a compressor section including at least one compressor rotor, a combustor section and a turbine section including at least one turbine rotor. The turbine rotor is connected to drive a shaft which in turn is connected to a drive at least one of the compressor rotor and the fan. A bearing is mounted to a static structure outwardly of the shaft, and supports the shaft. A bearing compartment is defined by face seal arrangements on each of two axial sides of the bearing. Each face seal arrangement includes a seal seat rotating with the shaft and a non-rotating face seal. Each non-rotating face seal includes a sealing ring mounted to a seal housing. The sealing ring includes a mount portion mounted to the seal housing and a sealing face biased into contact with the seal seat. The sealing ring also has a groove defined remote from the seal face relative to the seal seat. The groove provides a pressure face that will be exposed to high pressure air outward of the bearing compartment. A coil spring biases the seal housing towards the seal seat, such that the sealing face of the sealing ring is biased into contact with the seal seat by air pressure against the pressure face, and the coil spring. A balance ratio is defined between an area of the pressure face and an area of the sealing face, the balance ratio is between 0.5 and 0.64.

In another embodiment according to the previous embodiment, wherein the balance ratio is between 0.52 and 0.58.

In another embodiment according to any of the previous embodiments, the seal housing is formed of one of a titanium alloy and a ceramic.

In another embodiment according to any of the previous embodiments, the at least one compressor rotor includes a high speed compressor rotor and a low speed compressor rotor. The at least one turbine rotor includes a high speed turbine rotor and a low speed turbine rotor. A low speed turbine rotor drives the low speed compressor rotor through a low speed shaft. The high speed turbine rotor drives the high speed compressor rotor through a high speed shaft.

In another embodiment according to any of the previous embodiments, the high speed shaft is the shaft supported by the bearing.

In another embodiment according to any of the previous embodiments, the low speed shaft is the shaft supported by the bearing.

In another embodiment according to any of the previous embodiments, the low speed shaft also drives the fan rotor through a gear reduction, and the gear reduction drives a fan shaft. The fan shaft is the shaft supported by the bearing.

In another embodiment according to any of the previous embodiments, the seal seat has a radially outermost surface and the sealing ring has a radially outermost surface. The seal seat radially outermost surface extends radially outward of the sealing ring radially outermost surface.

In another embodiment according to any of the previous embodiments, the seal seat has a radially outermost surface and the sealing ring has a radially outermost surface. The seal seat radially outermost surface is radially inward of the sealing ring radially outermost surface.

In another embodiment according to any of the previous embodiments, the width quantity is defined as the balance ratio multiplied by a radial width of the sealing face divided by an outer diameter of the sealing ring at the sealing face, and the width quantity is between 0.009 and 0.013 or between 0.0135 and 0.0160.

In another embodiment according to any of the previous embodiments, the seal seat has an inner diameter and an outer diameter. There is a plurality of slots circumferentially spaced and have an inlet to receive oil from an inner diameter of the seal seat and a circumferentially spaced outlet to outlet oil to an outer diameter of the seal seat and a plurality of drain grooves circumferentially spaced and radially inward of the slots. A supply groove connects the inner diameter to the inlet in the slots and a discharge groove connects the outlet of the slots to the outer diameter. A drain groove discharge groove communicates the drain grooves to the outer diameter.

In another embodiment according to any of the previous embodiments, the inlet groove, the outlet groove, and the discharge groove all extend at an angle that is not directly radially outward of a rotational axis of the seal seat. The seal seat rotates in a first circumferential direction. The angles of each of the inlet groove, outlet groove and drain groove have a radially outward component and a component in a circumferential direction opposed to the first circumferential direction.

In another featured embodiment, a face seal arrangement includes a seal seat for rotating with a shaft and a non-rotating face seal. Each the non-rotating face seal includes a sealing ring mounted to a seal housing. The sealing ring includes a mount portion mounted to the seal housing and a sealing face biased into contact with the seal seat. The sealing ring also has a groove defined remote from the seal face relative to the seal seat. The groove provides a pressure face that will be exposed to high pressure air. A coil spring biases the seal housing towards the seal seat, such that the sealing face of the sealing ring is biased into contact with seal seat by air pressure against the pressure face, and the coil spring. A balance ratio is defined between an area of the pressure face and an area of the sealing face. The balance ratio is between 0.5 and 0.64.

In another embodiment according to the previous embodiment, the balance ratio is between 0.52 and 0.58.

In another embodiment according to any of the previous embodiments, the seal housing is formed of one of a titanium alloy and a ceramic.

In another embodiment according to any of the previous embodiments, the width quantity is defined as the balance ratio multiplied by a radial width of the sealing face divided by an outer diameter of the sealing ring at the sealing face, and the width quantity being between 0.009 and 0.013 or between 0.0135 and 0.0160.

In another embodiment according to any of the previous embodiments, the seal seat has a radially outermost surface and the sealing ring has a radially outermost surface. The seal seat radially outermost surface extends radially outward of the sealing ring radially outermost surface.

In another embodiment according to any of the previous embodiments, the seal seat has a radially outermost surface and the sealing ring has a radially outermost surface. The seal seat radially outermost surface is radially inward of the sealing ring radially outermost surface.

In another embodiment according to any of the previous embodiments, the seal seat has an inner diameter and an outer diameter. There are a plurality of slots circumferentially spaced and has an inlet to receive oil from an inner diameter of the seal seat and a circumferentially spaced outlet to outlet oil to an outer diameter of the seal seat and a plurality of drain grooves circumferentially spaced and radially inward of the slots. A supply groove connects the inner diameter to the inlet in the slots and a discharge groove connecting the outlet of the slots to the outer diameter. A drain groove discharge groove communicates the drain grooves to the outer diameter.

In another embodiment according to any of the previous embodiments, the inlet groove, the outlet groove, and the discharge groove all extend at an angle that is not directly radially outward of a rotational axis of the seal seat. The seal seat rotates in a first circumferential direction. The angles of each of the inlet groove, outlet groove and drain groove have a radially outward component and a component in a circumferential direction opposed to the first circumferential direction.

These and other features of the present invention can be best understood from the following specification and drawings, the following of which is a brief description.

DETAILED DESCRIPTION

Figure 1:
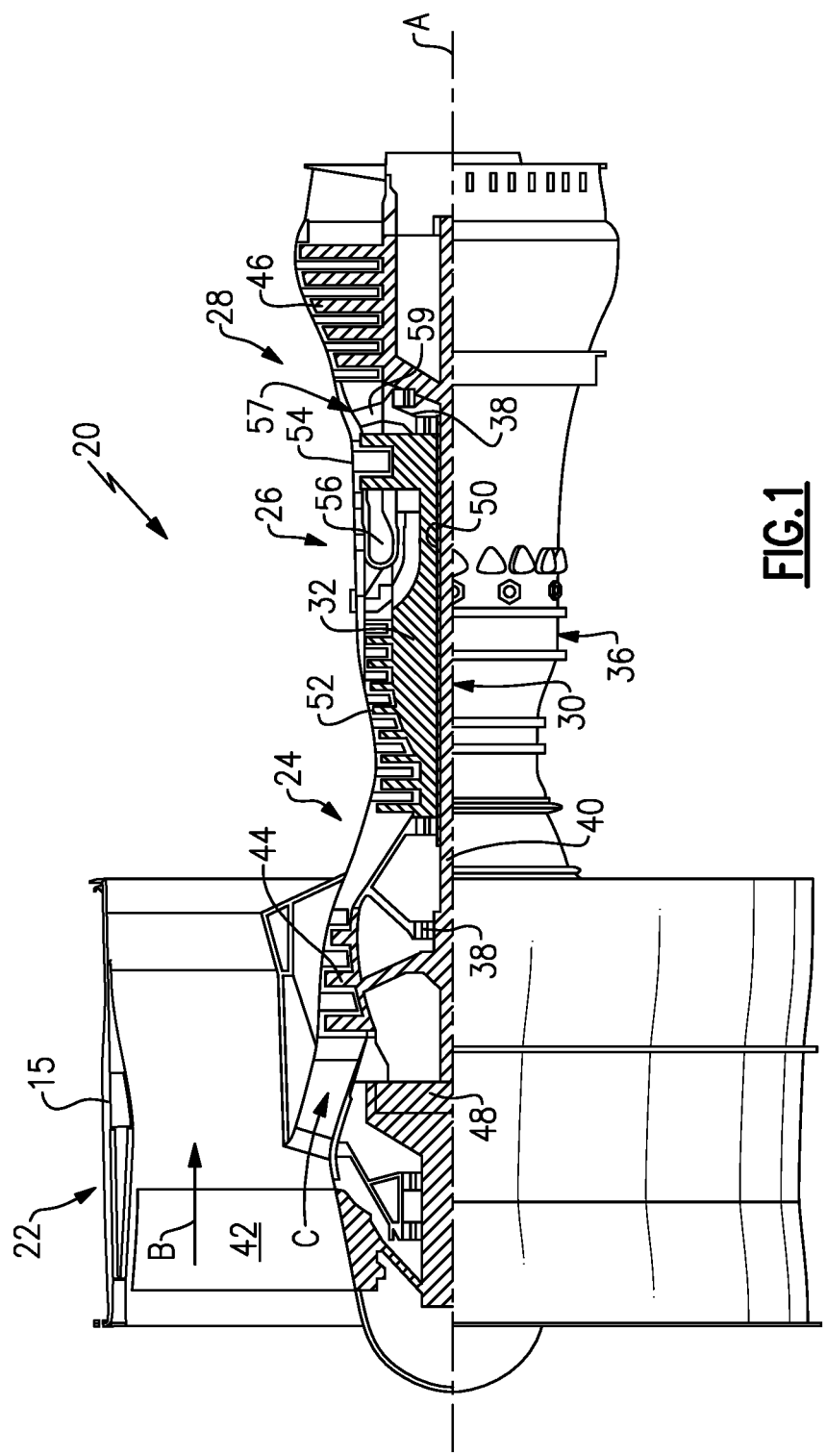
FIG. 1 shows a standard gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
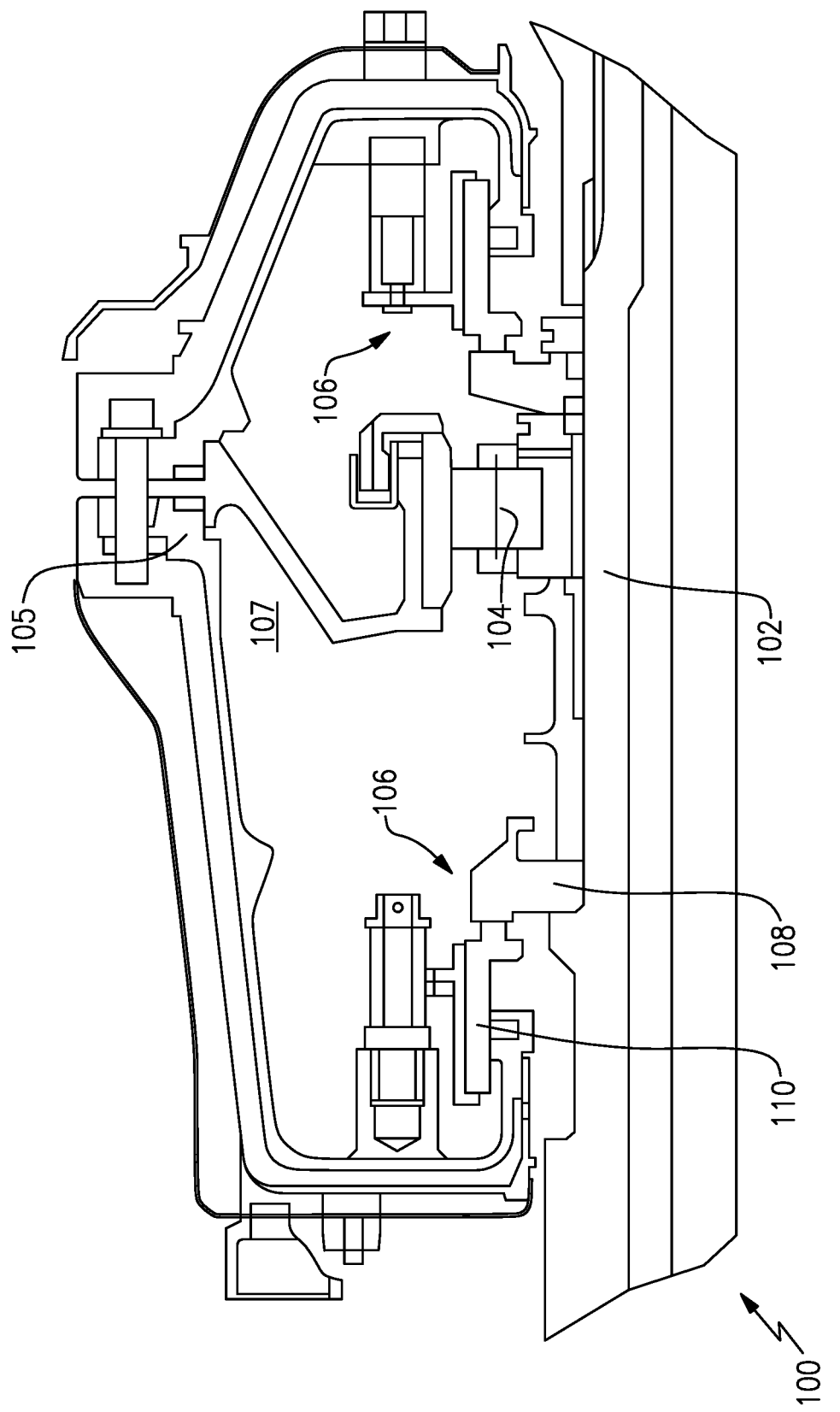
FIG. 2 shows a prior art bearing compartment in an engine such as the FIG. 1 engine.

In an engine such as FIG. 1 bearings 38 support the shafts. FIG. 2 shows one such bearing 104 supporting the shaft 102 of the high speed spool. A face seal arrangement 106 is shown at each of two sides of a bearing compartment 107. As known, bearing compartment 107 may be supplied with lubricant, and the face seal arrangements 106 seal the compartment to resist migration of the lubricant outwardly of the compartment 107.

The face seal arrangements 106 include a rotating seal seat 108 which rotates with the shaft 102, and a non-rotating face seal 110.

While the shaft 102 is disclosed as part of the high speed spool, the seals of the disclosure could provide benefits at any of the bearing locations shown in FIG. 1. That is, the seals could be associated with bearings supporting the low speed spool or the gear reduction and fan shaft.

Figure 3:
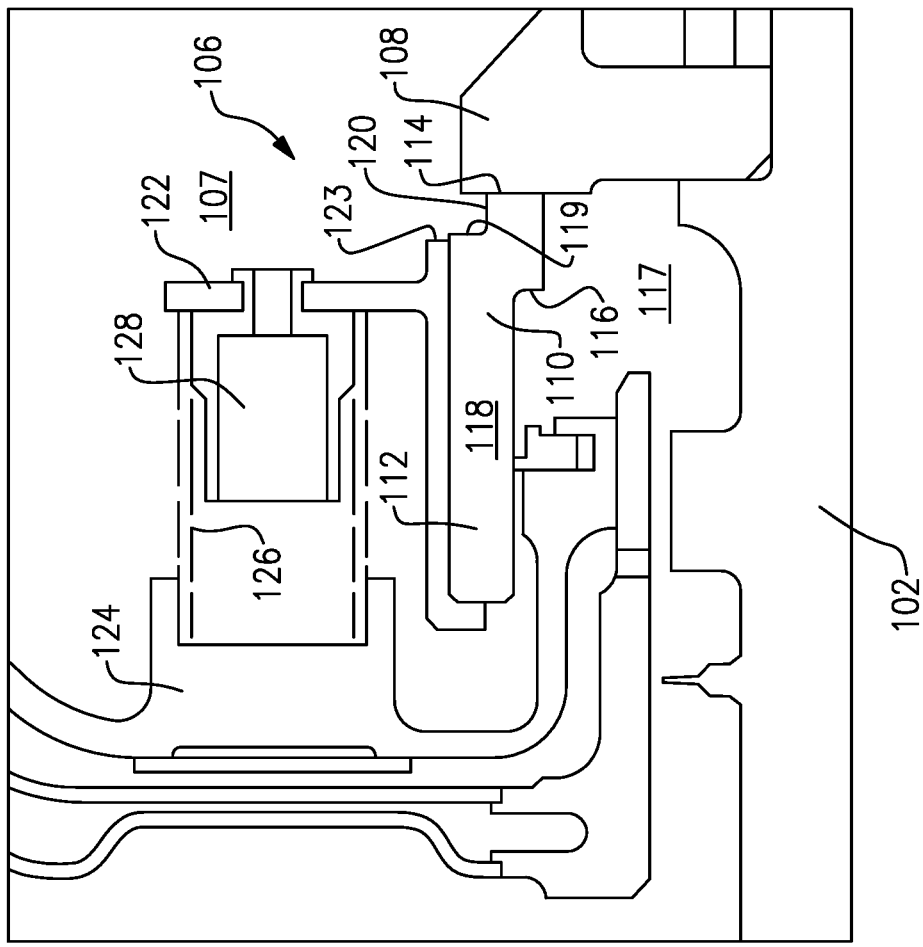
FIG. 3 shows a detail of a prior art face seal and seal seat.

FIG. 3 shows details of face seal arrangement 106 having the seal seat 108 and the face seal 110. Non-rotating face seal 110 includes a sealing ring 112 having a sealing face 114 biased into contact with the seal seat 108. The sealing ring 112 includes a mount portion 118, a first groove 116 on an opposed side of the sealing face 114 from the seal seat 108. As known, the groove 116 provides a bias area that will see high pressure air and will bias the sealing face 114 against the seal seat 108. A second groove 120 is shown radially outwardly of the sealing face 114.

The groove 120 results in a sealing face 114 of a desired size. A proud face 119 also remains in the sealing ring 112 forward of a forward end 123 of a seal housing 122. With wear on the sealing face 114 the proud face will prevent contact between the forward end 123 of seal housing 122 and the seal seat 108.

Generally the seal seat is formed of a metal such as steel, titanium or nickel based alloys. However, ceramics or molybdenum alloys may also be utilized.

A chamber 117 associated with the pressure face provided by groove 116 is at relatively high air pressure. A compartment 107 associated with the groove 120 and proud face 119 is at relatively low air pressure.

A seal housing 122 carries the sealing ring 112 and provides a mount area for a coil spring 126. Coil spring 126 is mounted about a spring guide 128.

The air pressure force from the pressure face created by the groove 116 and the force of the coil springs 126 bias the sealing ring sealing face 114 against the rotating seal seat 108.

Note, this Figure is not drawn to scale.

Figure 4:
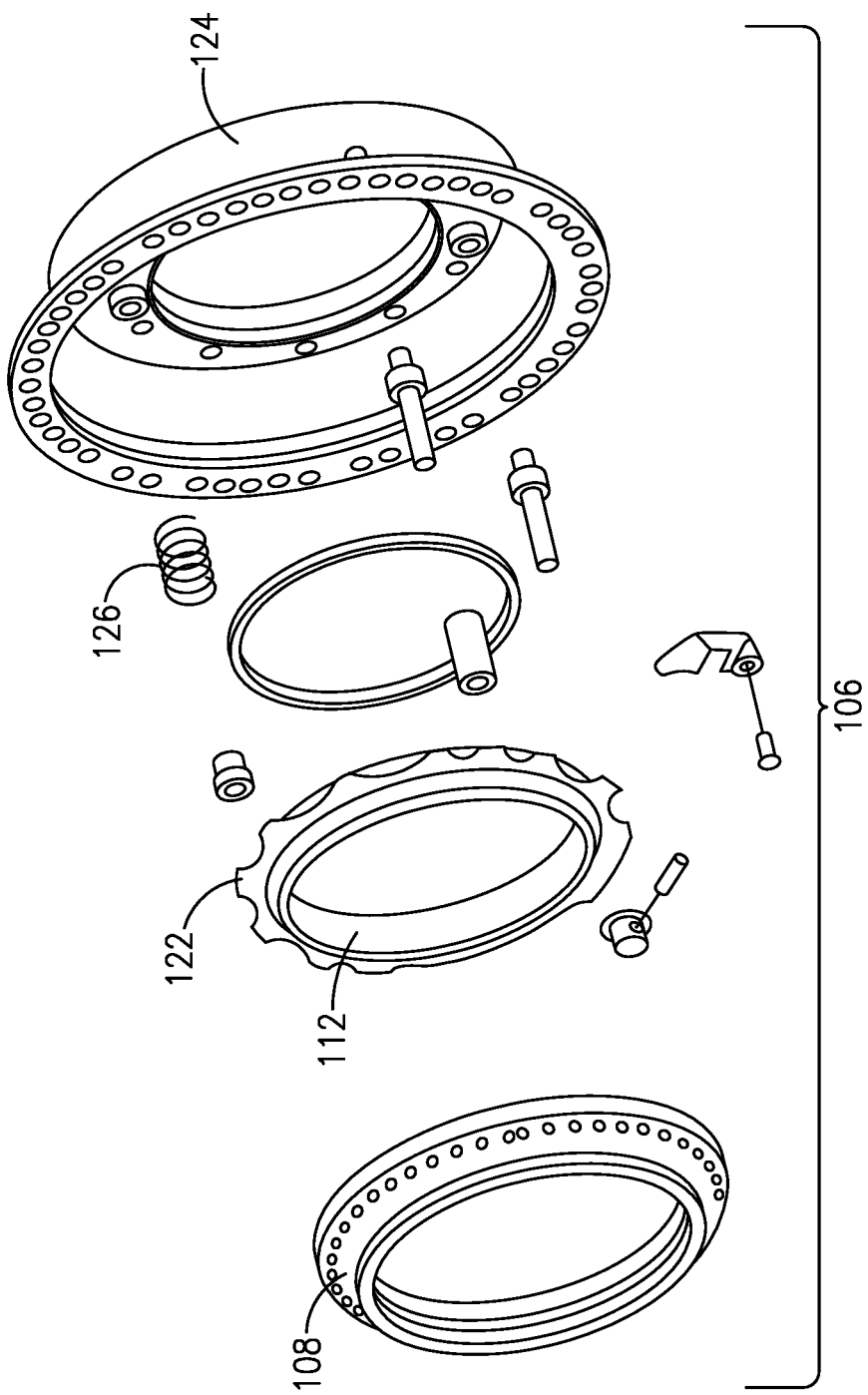
FIG. 4 is an exploded view of the components of a face seal and seal seat.

FIG. 4 shows an exploded view of the support case 124, coil springs 126, seal housing 122, sealing ring 112, and the seal seat 108.

Figure 5:
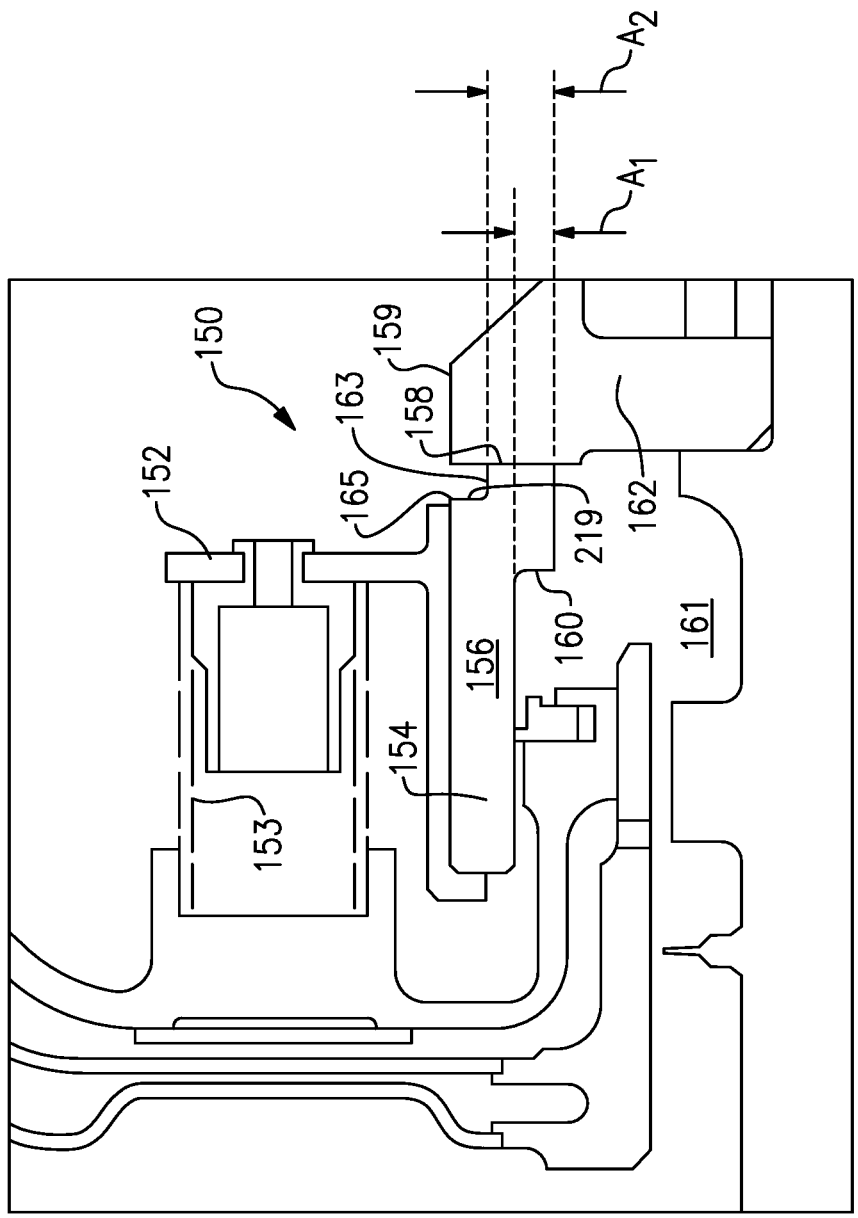
FIG. 5 shows a first embodiment face seal and seal seat.

FIG. 5 shows a face seal arrangement 150. Face seal arrangement 150 includes a seal housing 152 mounting coil springs 153. The sealing ring 154 has the mount portion 156, a sealing face 158 and grooves 160 and 163. A balance ratio can be defined between an area $A_1$, which is the area of the face created by the groove 160 against which high pressure air in compartment 161 biases the sealing ring 154 sealing face 158 against seal seat 162, and area $A_2$ which is the contact area of the sealing face 158.

That is: Balance Ratio=$A_1/A_2$

In this embodiment, the radially outer surface 159 of the seal seat 162 is shown extending radially outwardly of a radially outermost portion 165 of the proud face 219 of the sealing ring 154.

In the prior art this balance ratio has been relatively high, and typically between 0.65 and 0.7. Applicant has determined that reducing this balance ratio will reduce some of the concerns in the Background of the Invention section above. This reduction in the balance ratio reduces seal axial closing force and heat generation, resulting in lower component temperatures. This will mitigate and reduce oil coke formation, resulting in reduced seal wear and improved seal reliability. Thus, as shown in FIG. 5, the balance ratio is reduced. In embodiments, the balance ratio may be between 0.5 and 0.64. More narrowly, the balance ratio might be between 0.52 and 0.58. In one seal embodiment the balance ratio was 0.55.

However, to allow the reduction and balance ratio, other changes may be suggested.

Figure 6:
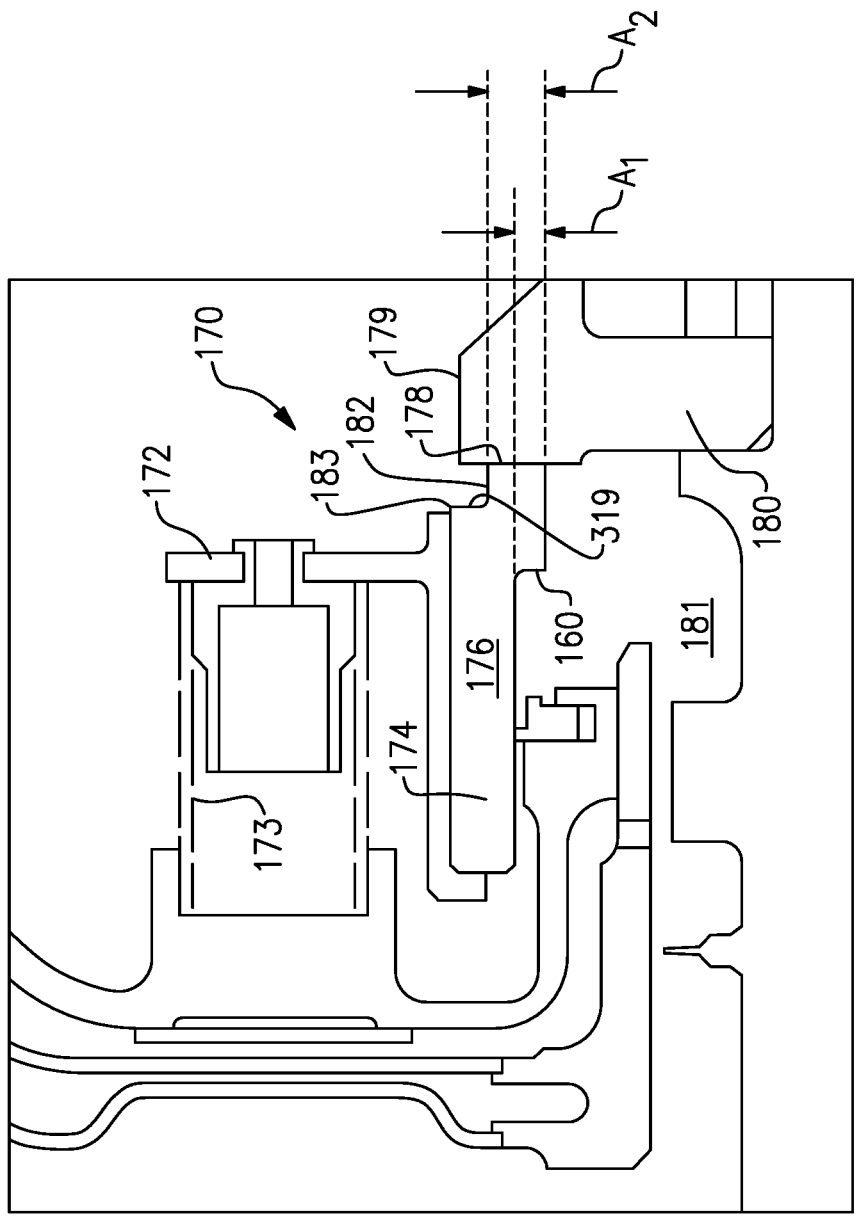
FIG. 6 shows a second embodiment face seal.

FIG. 6 shows another embodiment 170. The sealing ring 174 has the mount portion 176, the groove 160 associated with a compartment 181 receiving high pressure air, a sealing face 178 and a groove 182. Here, the balance ratio between areas $A_1$ and $A_2$ may be in the same ranges as in the FIG. 5 embodiment. However, as can be appreciated by comparing the two Figures, the area $A_2$ and the area $A_1$ are each smaller than in FIG. 5. This may provide even greater advantages, such as reducing overall seal axial closing force and heat generation, thus resulting in lower component temperatures. This should mitigate and reduce oil coke formation. Resulting benefits include reduced seal wear, and improves seal reliability.

A width quantity can be defined that speaks to the relative sizes of the sealing faces in the FIGS. 5 and 6 sealing ring embodiments. The width quantity is:

WIDTH QUANTITY=(BR×W)/D; wherein BR is the balance ratio, W is the radial width of the sealing face and D is the outer diameter.

For the FIG. 5 embodiment, the width quantity ranges between 0.0135 and 0.0160. For the FIG. 6 embodiment, the width quantity ranges between 0.009 and 0.013. The benefits such as mentioned above flow from the other aspects disclosed in this application, but also the reduced width quantity for the FIG. 6 embodiment compared to FIG. 5.

In the embodiment of FIG. 6, the radially outermost surface 179 of the seal seat 180 is radially inward of the radially outermost portion 183 of the proud face 319 sealing ring 174.

While the sealing ring may be described as a carbon ring, this should not be interpreted as requiring the ring to be formed of carbon. Note sealing rings may include graphitic carbon or electrographitic carbon. However, ceramics and metallics may also be utilized within the scope of this disclosure.

Figure 7:
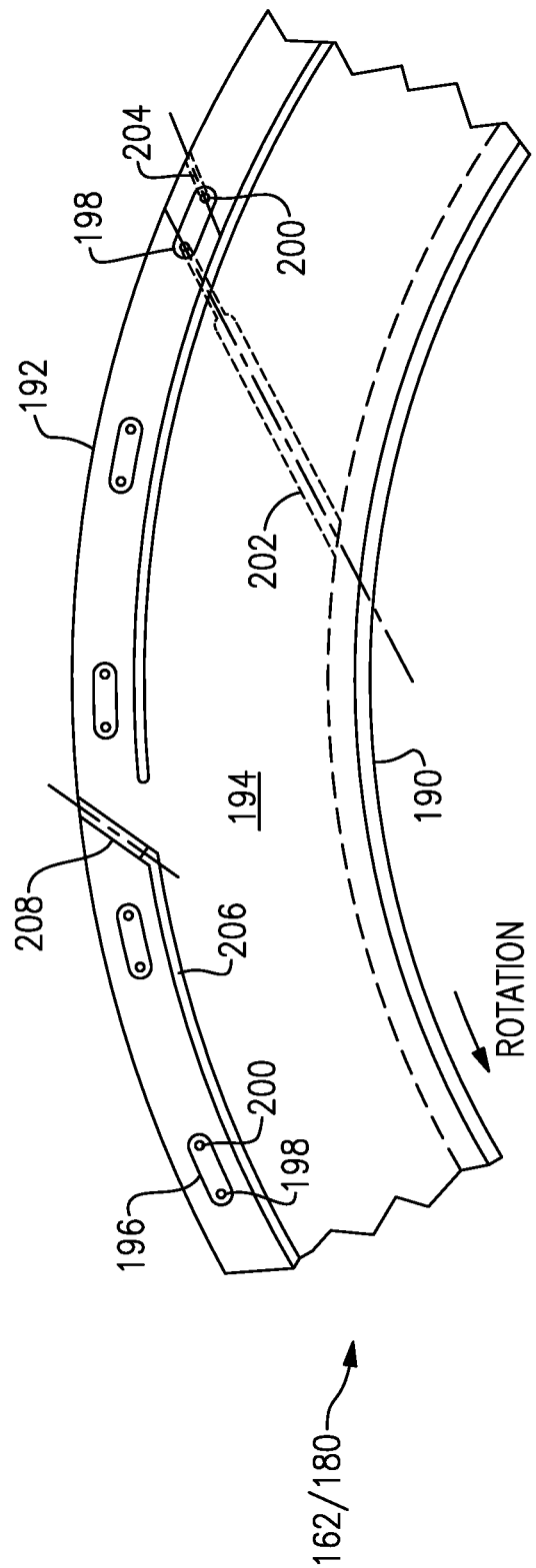
FIG. 7 shows details of a seal seat associated with the FIGS. 5 and 6 embodiments.

Details of the seal seat 162/180 are illustrated in FIG. 7. A sealing face 194 would be in contact with the sealing faces 158/178. There is an inner diameter 190 and an outer diameter 192. The ring is shown having a counter-clockwise direction of rotation in this Figure. There are a plurality of slots 196, which may be called oil slots or pools. In addition, each slot 196 has an inlet 198 and an outlet 200. Outlet 200 is spaced from the inlet 198 in a direction opposed to the direction of rotation. An oil slot or groove 202 extends from an inlet associated with the inner diameter 190 and communicates with the inlet 198 in the oil slots 196. An outlet drain hole 204 carries oil from outlet 200 to the outer diameter 192.

A plurality of drain grooves 206 are positioned radially inward of the slots 196. Discharge grooves 208 extend from a downstream circumferential end of the grooves 206 to the outer periphery 192. Discharge grooves 208 could be at the other circumferential locations in grooves 206.

Grooves and drain holes 202, 204 and 208 extend at an angle that is not directly radially outwardly relative to a rotational or central axis of the seal seat 162/180. The angle extends with a radially outward component, but also with a circumferential component opposed to the direction of rotation. In alternative embodiments, the grooves may extend at different angles, including directly radially outwardly, or any number of angles include 30 degrees, 45 degrees, 50 degrees, 60 degrees, etc.

The provision of the oil to the interface between the sealing faces 158/178 and the seal seat is particularly important given the reduced balance ratio of this disclosure.

This structure would also be preferably found in the seal seat 180.

With either embodiment further enhancements might improve the functioning of the face seal arrangements. As an example, the moment of inertia of the seal housing and the sealing ring may be reduced. A reduced density may be utilized for the sealing ring than has been the case in the prior art. Further, the weight of the seal housing may be reduced. Typically in the prior art, the seal housings were formed of steel or nickel. The seal housing 172 may be formed of titanium alloy or ceramics, thus reducing the weight and the moment of inertia. All of these changes allow a reduction in the spring force provided by the coil spring 173 compared to the prior art.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising:
   a fan for delivering air into a bypass duct as propulsion air and to a core engine, said core engine including a compressor section including at least one compressor rotor, a combustor section and a turbine section including at least one turbine rotor, said turbine rotor connected to drive a shaft which in turn is connected to drive at least one of said compressor rotor and said fan, a bearing mounted to a static structure outwardly of said shaft, and supporting said shaft;
   a bearing compartment defined by face seal arrangements on each of two axial sides of said bearing, each said face seal arrangement including a seal seat rotating with said shaft and a non-rotating face seal, each said non-rotating face seal including a sealing ring mounted to a seal housing, said sealing ring including a mount portion mounted to said seal housing and a sealing face biased into contact with said seal seat, said sealing ring also having a groove defined remote from said seal face relative to said seal seat, and said groove providing a pressure face that will be exposed to high pressure air outward of said bearing compartment, and a coil spring biasing said seal housing towards said seal seat, such that said sealing face of said sealing ring is biased into contact with seal seat by air pressure against said pressure face, and said coil spring; and
   a balance ratio defined between an area of said pressure face and an area of said sealing face, said balance ratio being between 0.5 and 0.64.

2. The gas turbine engine as set forth in claim 1, wherein said balance ratio is between 0.52 and 0.58.

3. The gas turbine engine as set forth in claim 1, wherein said seal housing is formed of one of a titanium alloy and a ceramic.

4. The gas turbine engine as set forth in claim 1, wherein said at least one compressor rotor including a high speed compressor rotor and a low speed compressor rotor, and said at least one turbine rotor including a high speed turbine rotor and a low speed turbine rotor, and a low speed turbine rotor driving said low speed compressor rotor through a low speed shaft, and said high speed turbine rotor driving said high speed compressor rotor through a high speed shaft.

5. The gas turbine engine as set forth in claim 4, wherein said high speed shaft being said shaft supported by said bearing.

6. The gas turbine engine as set forth in claim 4, wherein said low speed shaft being said shaft supported by said bearing.

7. The gas turbine engine as set forth in claim 4, wherein said low speed shaft also driving said fan rotor through a gear reduction, and said gear reduction driving a fan shaft, said fan shaft being said shaft supported by said bearing.

8. The gas turbine engine as set forth in claim 1, wherein said seal seat having a radially outermost surface and said sealing ring having a radially outermost surface, said seal seat radially outermost surface extending radially outward of said sealing ring radially outermost surface.

9. The gas turbine engine as set forth in claim 1, wherein said seal seat having a radially outermost surface and said sealing ring having a radially outermost surface, said seal seat radially outermost surface being radially inward of said sealing ring radially outermost surface.

10. The gas turbine engine as set forth in claim 1, wherein a width quantity is defined as the balance ratio multiplied by a radial width of the sealing face divided by an outer diameter of the sealing ring at the sealing face, and said width quantity being between 0.009 and 0.013 or between 0.0135 and 0.0160.

11. The gas turbine engine as set forth in claim 1, wherein said seal seat has an inner diameter and an outer diameter, and there being a plurality of slots circumferentially spaced and having an inlet to receive oil from an inner diameter of said seal seat and a circumferentially spaced outlet to outlet oil to an outer diameter of said seal seat and a plurality of drain grooves circumferentially spaced and radially inward of said slots, and a supply groove connecting said inner diameter to said inlet in said slots and a outlet groove connecting said outlet of said slots to said outer diameter, and a drain groove discharge groove communicating said drain grooves to said outer diameter.

12. The gas turbine engine as set forth in claim 11, wherein said inlet supply groove, said outlet groove, and said discharge groove all extending at an angle that is not directly radially outward of a rotational axis of said seal seat, said seal seat rotating in a first circumferential direction, and said angles of each of said supply groove, outlet groove and discharge groove having a radially outward component and a component in a circumferential direction opposed to said first circumferential direction.

13. A face seal arrangement comprising:
a seal seat for rotating with a shaft and a non-rotating face seal, each said non-rotating face seal including a sealing ring mounted to a seal housing, said sealing ring including a mount portion mounted to said seal housing and a sealing face biased into contact with said seal seat, said sealing ring also having a groove defined remote from said seal face relative to said seal seat, and said groove providing a pressure face that will be exposed to high pressure air, and a coil spring biasing said seal housing towards said seal seat, such that said sealing face of said sealing ring is biased into contact with seal seat by air pressure against said pressure face, and said coil spring; and
a balance ratio defined between an area of said pressure face and an area of said sealing face, said balance ratio being between 0.5 and 0.64.

14. The face seal arrangement as set forth in claim 13, wherein said balance ratio is between 0.52 and 0.58.

15. The face seal arrangement as set forth in claim 13, wherein said seal housing is formed of one of a titanium alloy and a ceramic.

16. The face seal arrangement as set forth in claim 13, wherein a width quantity is defined as the balance ratio multiplied by a radial width of the sealing face divided by an outer diameter of the sealing ring at the sealing face, and said width quantity being between 0.009 and 0.013 or between 0.0135 and 0.0160.

17. The face seal arrangement as set forth in claim 13, wherein said seal seat having a radially outermost surface and said sealing ring having a radially outermost surface, said seal seat radially outermost surface extending radially outward of said sealing ring radially outermost surface.

18. The face seal arrangement as set forth in claim 13, wherein said seal seat having a radially outermost surface and said sealing ring having a radially outermost surface, said seal seat radially outermost surface being radially inward of said sealing ring radially outermost surface.

19. The face seal arrangement as set forth in claim 13, wherein said seal seat has an inner diameter and an outer diameter, and there being a plurality of slots circumferentially spaced and having an inlet to receive oil from an inner diameter of said seal seat and a circumferentially spaced outlet to outlet oil to an outer diameter of said seal seat and a plurality of drain grooves circumferentially spaced and radially inward of said slots, and a supply groove connecting said inner diameter to said inlet in said slots and a outlet groove connecting said outlet of said slots to said outer diameter, and a drain groove discharge groove communicating said drain grooves to said outer diameter.

20. The face seal arrangement as set forth in claim 19, wherein said supply groove, said outlet groove, and said discharge groove all extending at an angle that is not directly radially outward of a rotational axis of said seal seat, said seal seat rotating in a first circumferential direction, and said angles of each of said supply groove, outlet groove and discharge groove having a radially outward component and a component in a circumferential direction opposed to said first circumferential direction.

* * * * *